United States Patent
Bachl et al.

(10) Patent No.: US 7,965,665 B2
(45) Date of Patent: Jun. 21, 2011

(54) METHOD OF SIGNALING TRAFFIC MODE TRANSITION IN A WIRELESS COMMUNICATIONS SYSTEM

(75) Inventors: Rainer Walter Bachl, Nuremberg (DE); Anil M Rao, Cedar Knolls, NJ (US); Mirko Schacht, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 499 days.

(21) Appl. No.: 11/241,713

(22) Filed: Sep. 30, 2005

(65) Prior Publication Data
US 2007/0076641 A1   Apr. 5, 2007

(51) Int. Cl.
*G08C 17/00* (2006.01)
(52) U.S. Cl. ......... 370/311; 370/318; 455/522; 455/574
(58) Field of Classification Search .................. 370/335, 370/329, 342, 310, 311, 318, 328, 331, 332, 370/338, 349, 522; 455/343.2, 343.4, 434, 455/436, 450, 453, 515, 522, 574, 13.4, 127.1, 455/127.5, 69, 458, 466
See application file for complete search history.

(56) References Cited

U.S. PATENT DOCUMENTS

| 6,970,438 | B2 * | 11/2005 | Mate et al. | 370/329 |
| 7,391,831 | B2 * | 6/2008 | Lim | 375/347 |
| 2004/0047328 | A1 | 3/2004 | Proctor, Jr. et al. | 370/342 |
| 2004/0209638 | A1 * | 10/2004 | Beckman et al. | 455/522 |
| 2004/0252662 | A1 * | 12/2004 | Cho | 370/329 |
| 2004/0254980 | A1 * | 12/2004 | Motegi et al. | 709/203 |

FOREIGN PATENT DOCUMENTS

| EP | 1 487 156 | 12/2004 |
| EP | 1 511 342 | 3/2005 |

OTHER PUBLICATIONS

"Universal Mobile Telecommunications System (UMTS)," *European Telecommunications Standards Institute (ETSI)*, vol. 3-R2, No. V640, (Sep. 2005), pp. 1-34.
PCT/US2006/036860, International Search Report, (Sep. 21, 2006).

* cited by examiner

*Primary Examiner* — Anthony S Addy
(74) *Attorney, Agent, or Firm* — John Ligon

(57) ABSTRACT

In a UMTS wireless communication system a UE autonomously determines that it is going to transit from an active traffic mode into an idle traffic mode and informs the NodeBs in its active set that it is doing so. It does so either by using Layer 1 signaling, using the uplink DPCCH to send a message to the NodeBs indicating the transition, or by using Layer 2 signaling by via MAC PDUs that contain the message, which are delivered on the uplink E-DPDCH to the NodeBs.

13 Claims, 2 Drawing Sheets

METHOD OF SIGNALING TRAFFIC MODE TRANSITION IN A WIRELESS COMMUNICATIONS SYSTEM

TECHNICAL FIELD

This invention relates to wireless communications.

BACKGROUND OF THE INVENTION

A wireless communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), and a base station (BS) or NodeB. The dedicated physical channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.).

Newer versions of these standards, for example, Release 6 of UMTS provide for high data rate uplink channels referred to as enhanced dedicated physical channels. These enhanced dedicated physical channels may include an enhanced data part (e.g., an enhanced dedicated physical data channel [E-DPDCH] in accordance with UMTS protocols) and an enhanced control part (e.g., an enhanced dedicated physical control channel [E-DPCCH] in accordance with UMTS protocols). In addition, Release 6 moved more of the intelligence of the system away from the Radio Network Controller (RNC) and towards the NodeB and UE by introducing a processor called the MAC-e (medium access control-enhanced) at both the NodeB and the UE. The MAC-e processor at the NodeB is responsible for scheduling when different UEs can transmit data and at what maximum data rate the UEs may transmit. The MAC-e processor at the UE is responsible for multiplexing data from different traffic flows based on priority as well as assembling scheduling information to inform the MAC-e processor at the NodeB about items such as the amount of data in the UEs buffer that is awaiting transmission, as well as the amount of power the UE has available to transmit data. The MAC-e processor at the UE packages this information in what is known as a MAC-e SI (Scheduling Information).

Recently a work item was introduced in the 3GPP ($3^{rd}$ Generation Partnership Project) titled "Continuous Connectivity for Packet Data Users" which is intended to significantly increase the number of inactive packet data users that can maintain a dedicated connection to the network. Under this work item, it has been proposed that when there is traffic inactivity on both the uplink and the downlink, that the UE move into what may be called an "idle traffic mode." In this mode the UE would somehow reduce the power or the frequency of transmissions on the DPCCH and possibly shut down the HS-DPCCH (high speed dedicated physical control channel) which is used to support downlink data transmissions on HSDPA (high speed downlink packet access). In addition, reducing the power on the DPCCH may require the UE to change the mode of its power control to maintain reliability, one such option is to employ the existing DPC (downlink power control) Mode 1 in which the power control bits are repeated.

While proposals have been made on what measures the UE could take when moving from an active traffic mode into the idle traffic mode, little attention has been given to how both the UE and the network would be informed that the UE is to be put in the idle traffic mode.

SUMMARY OF THE INVENTION

In accordance with an embodiment of the present invention, the UE autonomously determines that it is going to transit been an active traffic mode into the idle traffic mode and indicate that information in a message sent to the network. For example, the UE may determine that it will transit into the idle traffic mode when it detects a lack of traffic in both the uplink and downlink for a predetermined amount of time.

In accordance with a first embodiment of the invention, the UE indicates to the network of its transition from an active traffic mode into the idle traffic mode by using Layer 1 signaling on the uplink dedicated physical control channel (DPCCH), which channel is normally continuously transmitted by the UE to the NodeBs within its active set. For example, the feedback indicator (FBI) bits can be used to construct special messages that indicate the transition to the idle traffic mode and which would be recognized as such by the NodeBs which receive them.

In accordance with a second embodiment of the invention, the UE indicates to the network its transition from an active traffic mode into the idle traffic mode by using Layer 2 signaling via MAC (medium access control) PDUs (packet data units) delivered on the uplink E-DPDCH to the NodeBs in the UE's active set. For example, the MAC-e SI (scheduling information) PDUs can be used to carry a message indicating the transition into the idle traffic mode using a special codeword that is recognized by the NodeBs which receive it. Alternatively, for example, the message to convey the transition into the idle traffic mode can be conveyed via some part of the MAC-e header where a special sequence of bits within the header is recognized by the receiving NodeBs as being indicative of the transition. Advantageously, using Layer 2 signaling provides error detection at the receiving NodeBs as well as acknowledgement to the UE of a correct reception of the message by the receiving NodeBs.

Similar Layer 1 or Layer 2 signaling can be used to indicate a transition from the idle traffic mode back to the active traffic mode.

DETAILED DESCRIPTION

Figure 1:
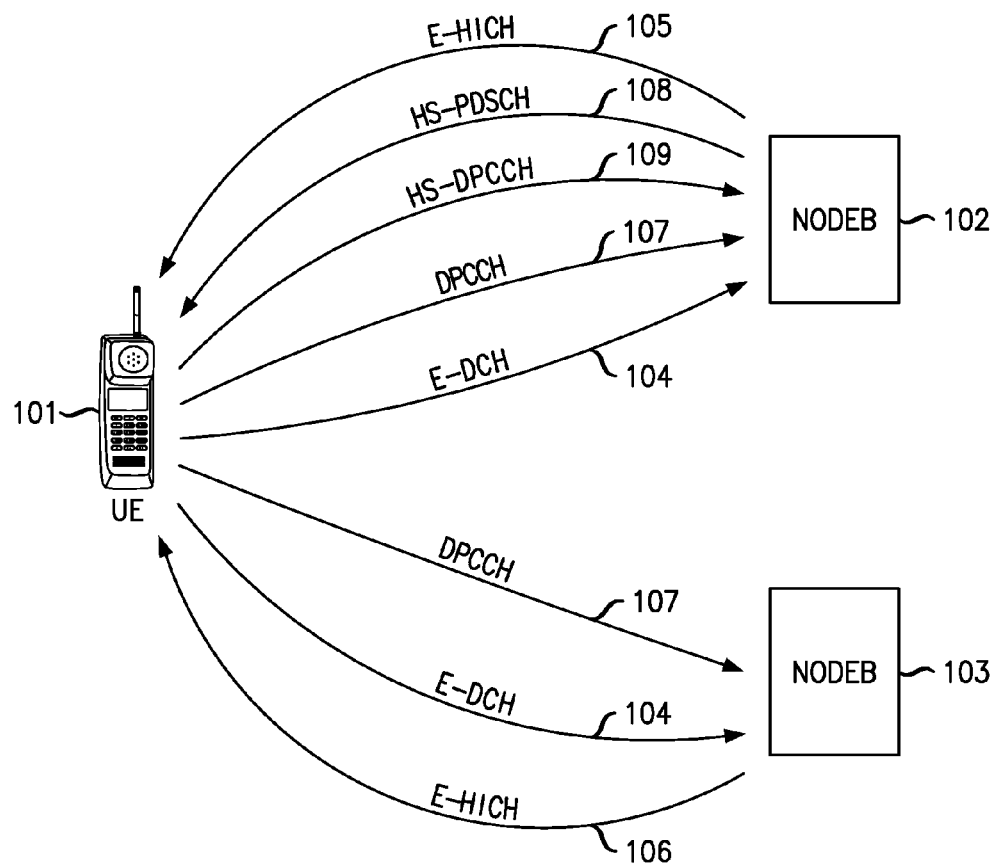
FIG. 1 is a block diagram of a wireless communications system in accordance with UMTS standards showing the data and control channels between a UE and the NodeBs in its active set.

With reference to FIG. 1, UE 101 is shown actively communicating on the enhanced data channel (E-DCH) 104 in a soft handoff situation with both NodeB 102 and NodeB 103, which comprise the UE's active set. As noted, E-DCH comprises E-DPDCH and E-DPCCH, not separately shown in the FIG. Although E-DCH 104 is shown being separately transmitted by UE 101 to NodeBs 102 and 103, it is a single transmission on the uplink that is received by both NodeBs 102 and 103. A frame transmitted on the uplink through E-DPDCH and E-DPCCH on the E-DCH to NodeBs 102 and 103 is independently decoded by both NodeBs. If the E-DPDCH frame is successfully decoded by either or both of NodeB 102 and NodeB 103, one or both of those NodeBs sends a positive acknowledgment (ACK) to UE 101 by a downlink transmission. From NodeB 102 the ACK is downlink sent on the E-HICH (enhanced HARQ [hybrid automatic repeat request] indicator channel) 105, and from NodeB 103 the ACK is sent downlink on the E-HICH 106. Continuous uplink transmissions on DPCCH 107 from UE 101 to NodeB 102 and NodeB 103 provide to each NodeB a pilot signal and feedback information. This information includes feedback indicator bits (FBI) and transmit power control bits (TPC) used to indicate to the NodeBs that they should increase or decrease their own transmit power. At any given time, only one NodeB, NodeB 102 for illustration, transmits high-speed data on the HS-PDSCH (high speed physical downlink shared channel) 108. UE 101 transmits to that one NodeB 102 downlink channel quality information (CQI) as well as acknowledgements for data received on the HS-PDSCH on the HS-DPCCH (high speed dedicated physical control channel) 109.

Many of the applications which are used on the enhanced uplink channels are inactive for long periods of time. It is therefore desirable to somehow reduce the transmissions on the continuous uplink DPCCH as well as transmissions of the CQI on the HS-DPCCH, all of which transmissions are wasteful of UE battery life as well as uplink capacity. When a predetermined length of inactivity is detected on the uplink and downlink, the UE is moved from an active traffic mode into the idle traffic mode in which transmissions on the uplink DPCCH and the HS-DPCCH are reduced or halted.

In accordance with an embodiment of the invention, the UE autonomously determines that it will transit from an active traffic mode into the idle traffic mode and indicates that information is a message sent to the network (i.e., to the NodeBs in its active set). For example, the UE may determine that it is going to transit into in the idle traffic mode by detecting inactivity on the downlink HS-PDSCH channel and the uplink E-DPDCH channel for some predetermined length of time.

The information that the UE is transiting into the idle traffic mode is needed by all the NodeBs with which the UE is communicating in order to properly decode information on the uplink DPCCH, which in this mode may be operating at a reduced power level or with a different slot format, or may not be sent at all. The UE may choose to change the power control mode used on the uplink DPDCH during this mode. For example, during the idle traffic mode the standards-defined downlink power control (DPC) Mode 1 may be used in which TPC commands are repeated three times in a row for improved TPC detection at the NodeB.

The UE can indicate to the network (the NodeBs which are in its active set) that it is transiting into the idle traffic mode via several alternatives.

In accordance with a first embodiment, the UE indicates to the network its transition into the idle traffic mode by using Layer 1 signaling on the uplink dedicated physical control channel (DPCCH). For example, the feedback (FBI) indicator bits can be used to construct special messages or codewords that indicate the transition to the idle traffic mode and which would be recognized as such by the receiving NodeBs. Layer 1 messaging has the advantage of short latency but has the disadvantage of lacking both an error detection mechanism and acknowledgements of the correct reception of a transmitted message by any or all of the NodeBs in the UE's active set. Thus, some of the advantages of diversity of reception are lost when not all of the NodeBs in the active set are made aware that the UE is in an idle traffic mode. In addition, if the DPC Mode 1 is being used by the UE in the idle traffic mode and a particular NodeB is not aware that the UE has transited into the idle traffic mode, then that unaware Node B will incorrectly interpret the repeated TPC commands sent to it on the uplink DPCCH, leading to large swings in the downlink power.

Figure 2:
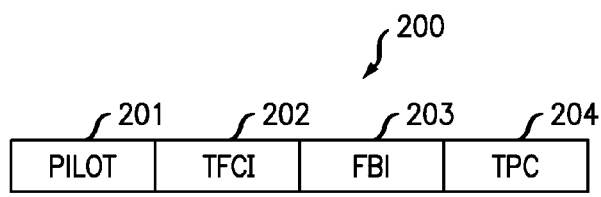
FIG. 2 shows the slot structure of the uplink DPCCH that the UE uses to indicate to the NodeBs in its active set that is transiting into the idle traffic mode in accordance with a first embodiment.

FIG. 2 shows the slot structure 200 of the uplink DPCCH which consists of pilot bits 201, transport format combination indicator (TFCI) bits 202, feedback indicator bits (FBI) 203, and transmit power control (TPC) bits 204. Certain bit combinations can be used on the FBI bits across multiple slots to form the message sent uplink to the NodeBs indicating the transition of the UE to the idle traffic mode.

Figure 3:
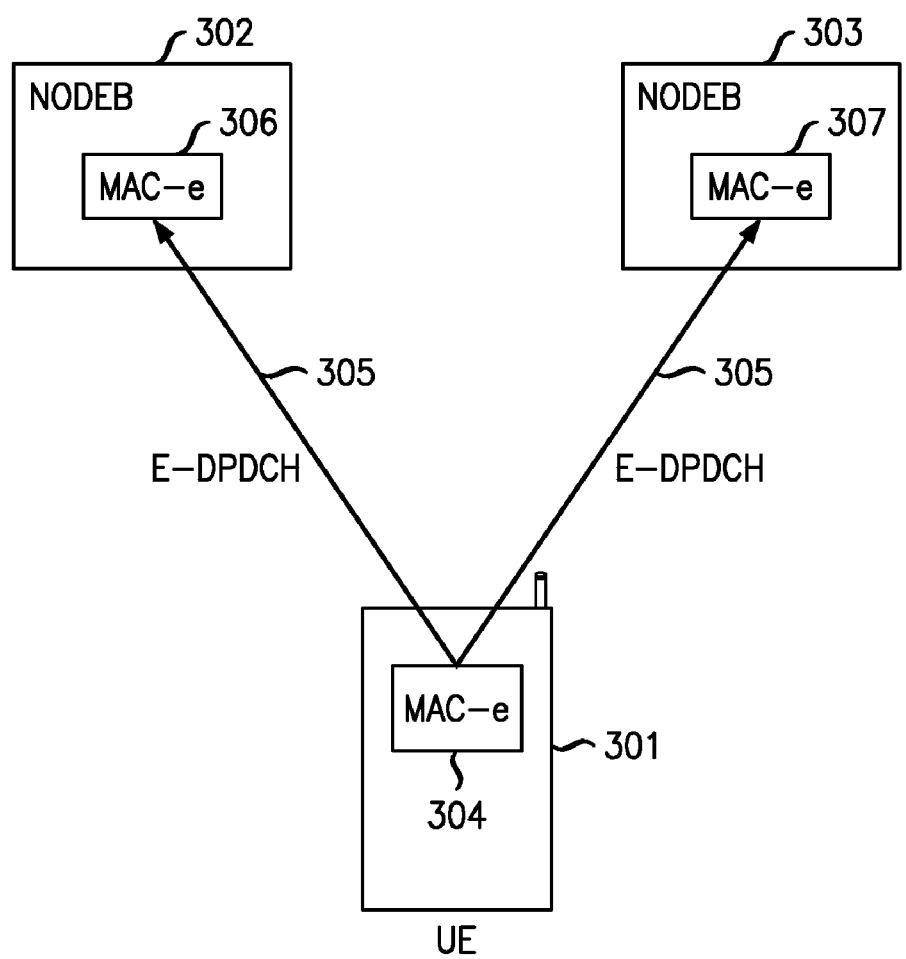
FIG. 3 is a block diagram showing a second embodiment in which Layer 2 signaling is used by the UE to convey to the NodeBs in its active set that it is transiting into the idle traffic mode.

In accordance with a second embodiment of the invention, the UE indicates to the network its transition into the idle traffic mode by using Layer 2 signaling via MAC (medium access control) PDUs (packet data units) delivered to the NodeBs in the UE's active set on the uplink E-DPDCH channel. FIG. 3 illustrates UE 301 communicating the transition to the idle traffic mode via Layer 2 messaging to the NodeBs 302 and 303 in its active set. MAC PDUs carrying the transition to idle mode message are emitted from MAC-e processor 304 in the UE 301 and are delivered via the E-DPDCH 305 to MAC-e processors 306 and 307 in NodeBs 302 and 303, respectively. For example, the MAC-e SI (scheduling information) PDUs can be used to carry the message indicating the transition of UE 301 into the idle traffic mode using a special codeword that is recognized by the MAC-e processors 306 and 307. Alternatively, for example, the message to convey the transition into the idle traffic mode can be conveyed via some part of the MAC-e header where a special sequence of bits within the header is recognized by the receiving MAC-e processors 306 and 307 as being indicative of the transition.

Advantageously, using Layer 2 signaling provides error detection at the receiving NodeBs 302 and 303 as well as acknowledgement to the UE 301 of correct reception of the message by the receiving NodeBs. The UE 301 can use the knowledge of NodeB acknowledgements to retransmit the Layer 2 message indicating the transition to the idle traffic mode to ensure that all NodeBs in its active set receive the message correctly. For reliable transmission of MAC PDUs containing Layer 2 messages, the UE 301 could use an additional amount of power on the E-DPDCH 305 to ensure correct reception by NodeBs 302 and 303 with low latency.

The techniques described above using either Layer 1 or Layer 2 signaling for indicating the transition from an active traffic mode into the idle traffic mode, can also be used for indicating the transition out of the idle traffic mode into an active traffic mode.

Although described above in conjunction with embodiments that are in accord with UMTS standards, the present invention could be applicable to other wireless standards in which a high-speed data packet channel and accompanying control channel are transmitted on the uplink or downlink between a mobile terminal and a base station or similar device, as for example wireless systems that are in accord with EVDO standards, WiMAX standards, or other standards that have been adopted or proposed, or standards that have not yet been adopted or proposed.

Accordingly, the above described embodiments are merely illustrative of the principles of the present invention. Other embodiments could be devised by those skilled in the art without departing from the spirit and scope of the present invention.

The invention claimed is:

1. A method at a mobile station in a wireless communication system comprising the steps of:
   autonomously deciding that it should transit between an active traffic mode and an idle traffic mode; and
   providing an indication of the traffic mode change to an associated base station by a signaling message sent via an uplink dedicated control channel, wherein the signaling message for indication of traffic mode change is provided by arranging a sequence of bits derived from a bits of a control message sent in one or more transmission intervals for the uplink dedicated control channel into another message recognizable by the associated base station as representing the traffic-mode-change signaling message, and detecting the another message when the uplink dedicated control channel is received at a base station.

2. The method of claim 1 wherein decision to transit between the active traffic mode and the idle traffic mode is determined based on a level of traffic on an uplink and downlink over a predetermined amount of time.

3. The method of claim 1 wherein the signaling message is sent using Layer 1 signaling.

4. The method of claim 3 wherein the signaling message is sent using feedback indicator (FBI) bits sent in one or more slots of an uplink dedicated physical control channel.

5. The method of claim 4 wherein the dedicated physical control channel is the DPCCH in a Universal Mobile Telecommunications System (UMTS).

6. The method of claim 1 wherein the signaling message is sent using Layer 2 signaling on an uplink dedicated physical data channel.

7. The method of claim 6 wherein the signaling message is sent using one or more MAC PDUs.

8. The method of claim 7 further comprising increasing the power at which the MAC PDUs containing the message are transmitted.

9. The method of claim 7 wherein one or more MAC-e SI PDUs are used to carry the message.

10. The method of claim 7 wherein a part of a MAC-e header in one or more PDUs is used to carry the message.

11. The method of claim 6 wherein the uplink dedicated physical data channel is the enhanced dedicated physical data channel (E-DPDCH) in a Universal Mobile Telecommunications System (UMTS).

12. A method of communication at a mobile station in a wireless communication system comprising the steps of:
   autonomously determining at the mobile station to transit between an active traffic mode and an idle traffic mode;
   providing an indication of the traffic mode change to an associated base station by a signaling message sent via layer 1 signaling on an uplink dedicated control channel, wherein the signaling message for indication of traffic mode change is provided by arranging a sequence of bits derived from a bits of a control message sent in one or more transmission intervals for the uplink dedicated control channel into another message recognizable by the associated base station as representing traffic-mode-change signaling message, and detecting the another message when the uplink dedicated control channel-is received at a base station.

13. A method of communication at a mobile station in a wireless communication system comprising the steps of:
   autonomously determining at the mobile station to transit between an active traffic mode and an idle traffic mode;
   providing an indication of the traffic mode change to an associated base station by a signaling message sent using layer 2 signaling via medium access control (MAC) packet data units (PDUs), wherein the signaling message for indication of traffic mode change is provided by arranging a sequence of bits derived from bits of one of one or more of the PDUs into a codeword recognizable by the associated base station as representing the traffic-mode-change signaling message, and detecting the codeword when the MAC PDUs are received at a base station.

* * * * *